SWITCHING CIRCUIT

Filed Jan. 9, 1957 2 Sheets-Sheet 1

INVENTOR
W. D. LEWIS
BY [signature]
ATTORNEY

INVENTOR
W. D. LEWIS
BY [signature]
ATTORNEY

United States Patent Office 2,936,337
Patented May 10, 1960

2,936,337
SWITCHING CIRCUIT

Willard D. Lewis, Mendham, N.J., assignor to Bell Telephone Laboratories, Incorporated, New York, N.Y., a corporation of New York Application January 9, 1957, Serial No. 633,358
13 Claims. (Cl. 179—15)

This invention relates to electrical transmission circuits and more particularly transmission circuits including gating networks applicable to information handling systems.

In present-day high speed information handling systems, a practice frequently employed in transferring information from one locality to another is time sharing or time division multiplexing which permits the simultaneous exchange of information between each one of a plurality of communication terminals and a corresponding one of a remote plurality of terminals over a common transmission link. This practice requires that in successive short time intervals, each pair of terminals in communication with each other be assigned a cyclically recurring discrete time slot during which information may be sampled and received. In the interval between appearances of the time slot assigned to a particular pair of terminals, the common transmission link is available to other communication terminals. By sampling at a sufficiently rapid rate and by proper filtering in transmission, an accurate reproduction of the information transmitted from one terminal of the pair may be formed at the other terminal of the pair.

Such a system may be utilized, for example, in various electrical and telephone systems where a plurality of communication devices may be connected via a common transmission link to another plurality of communication devices in order to conserve expensive transmission facilities. A system of this type is described in a patent application of E. T. Burton, A. L. Robinson and E. L. Younker, Serial No. 364,258, filed June 26, 1953.

It is necessary to incorporate in such systems a gating network which permits the complete transfer of information during the time slot period assigned to a terminal and complete obstruction to transfer of information at other times. As only a small portion of a given time interval is allotted to each pair of terminals in communication, the information which normally would have been transferred in the full time interval must be conveyed in a fraction thereof. It may be appreciated that in order to eliminate or at least substantially reduce the number of amplification components required in the individual communication channels, the maximum generated signal must be transferred, and to do so, transmission losses must be held to a minimum.

Low impedances in the line are employed which are capable of delivering large currents in short periods of time, and such impedances normally are low pass filter networks with shunt capacitances. This implies that the gating network will face a shunt capacitance in the line, thus presenting a major source of signal loss due to spark dissipation or high frequency oscillation on opening and closing of the gate as the adjacent capacitance charges and discharges through the gate. It is necessary to optimum performance of such a time sharing system that such losses at the transmission gates be minimized.

While this invention will be described with reference to telephone systems, it is to be understood that it is not to be considered as limited to telephone applications alone. Other applications may be in the field of computers, telegraph communication systems, data transmission systems, or any other systems utilizing high speed gating circuits.

It is a general object of this invention to provide an improved signal transmission network.

More specifically, it is an object of this invention to provide an improved time sharing transmission network capable of transmitting information between a plurality of remote terminals over a common transmission link.

It is a further object of this invention to provide a transmission network capable of transferring information across a gating circuit with extremely low loss in transfer.

These and other objects of this invention are attained in one specific illustrative embodiment wherein a transmission network of the type described in the aforementioned application of Messrs. Burton, Robinson and Younker comprises a pair of low pass filter networks with shunt capacitance connected by a high speed gating circuit. A small inductance is connected between the gating circuit and the filter network at the transmitting side of the gating circuit. Each filter network terminates in a capacitance.

A gating circuit which satisfies the requirements of alternate zero and infinite impedance to current flow in either direction is shown in J. D. Johannesen, P. B. Myers and J. E. Schwenker application Serial No. 570,530, filed March 9, 1956, now Patent No. 2,899,570, issued August 11, 1959. The circuit comprises a pair of transistors having their bases electrically connected together, their emitters electrically connected together and a magnetic core coupled to the base and emitter of each transistor. Such a gating circuit may be associated with a telephone station, for example, by connection of the station line to the collector of one transistor through a low pass filter and connection of a transmission line or trunk to the collector of the other transistor. The gate is activated to allow passage of signals therethrough for an interval defining a time slot. Activation to open and close the gate results from the application of timed pulses to the magnetic core.

Upon opening of the gate, the signal stored in the adjacent shunt capacitance of the input lead low pass filter is transferred through the gate to a shunt capacitance in the output lead low pass filter. Such connection of a charged capacitance to a similar uncharged capacitance normally results in a sharing of charges between them. Each capacitance ultimately possesses half the charge at half the voltage, or one-fourth of the original energy, the other half being dissipated in the spark upon circuit closure or in high frequency oscillations if the spark is avoided.

In accordance with this invention a small inductance is inserted in series with the gate to prevent buildup of any significant current while the gate is changing condition, thus preventing any loss corresponding to spark dissipation. The inductance is of a value such that a half cycle at the resonant frequency of the capacitance-inductance-gate-capacitance circuit is precisely the length of the time slot. Thus in one-half of an oscillation the charge on the input capacitance is transferred to the output capacitance. Timing of the gating circuit is such that the gate is closed at the instant of current reversal, thus preventing any return flow. By sarting slowly because of the inductance and by closing the gate at the instant of current reversal, a complete lossless transfer of signal may be accomplished in an ideal circuit of this type.

It is a feature of this invention that a capacitance, inductance, gating circuit and capacitance, define a signal transfer circuit.

It is another feature of this invention that the elements form a resonant circuit and that the gating circuit be activated to complete the resonant circuit for a period equal to one half cycle at the resonant frequency.

It is still another feature of this invention that the resonant transfer circuit comprise a capacitance, inductance, gating circuit, inductane and capacitance.

It is a further feature of this invention that the gating circuit comprise a pair of synchronously operated gates.

It is a still further feature of this invention that the circuit is balanced with respect to ground.

A complete understanding of these and other features of this invention may be gained from consideration of the following detailed description, together with the accompanying drawing in which.

Figure 1:
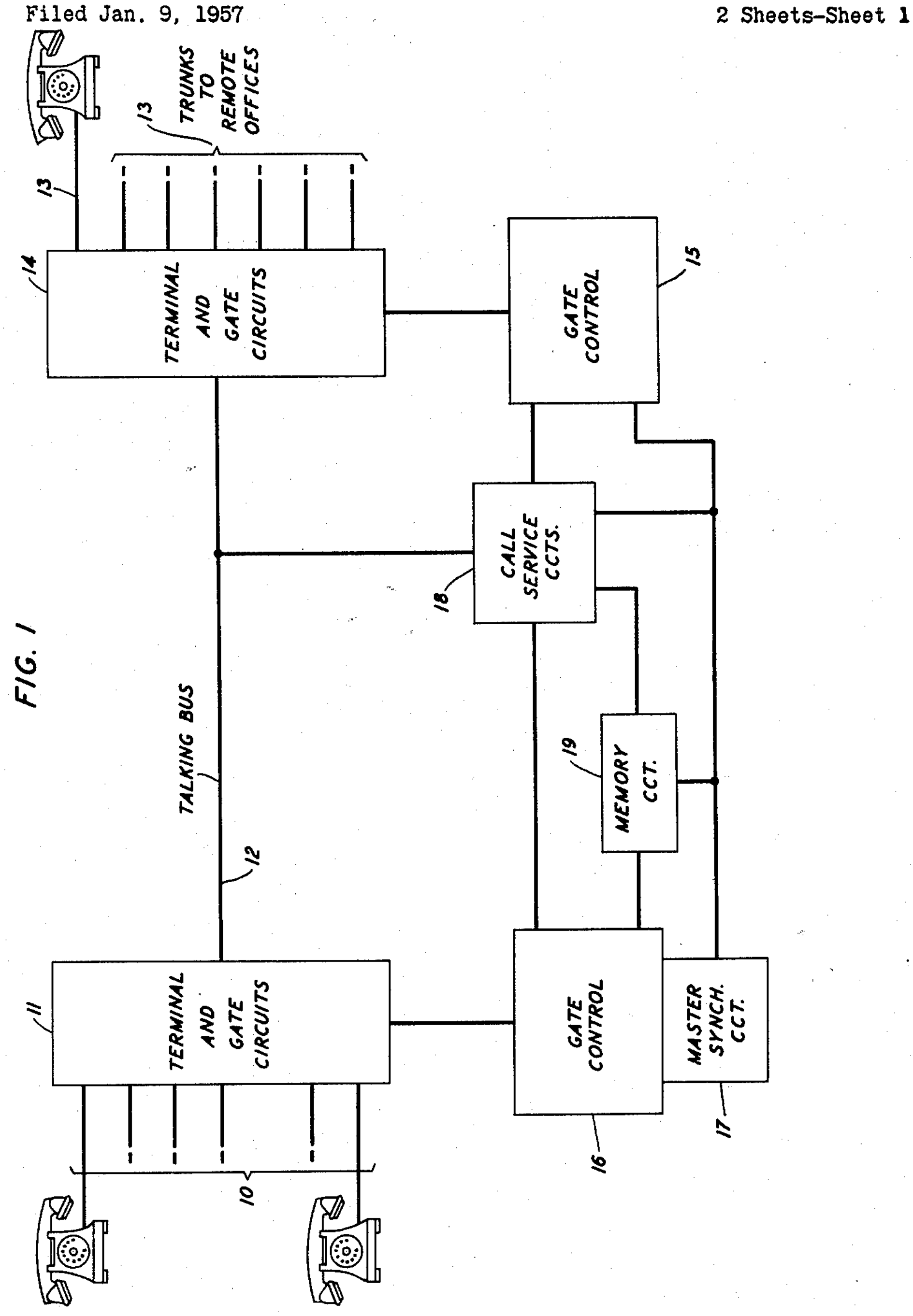
Fig. 1 is a schematic representation in block diagram form of a telephone system in which transfer circuits in accordance with this invention may be employed.

Turning now to the drawing, the basic elements of a time separation telephone exchange illustrative of one specific embodiment of this invention are depicted in Fig. 1. As there seen, a plurality of subscriber lines 10 are each connected through individual terminal and gate circuits 11 to a single common talking bus 12. Similarly, a plurality of trunks 13 or other subscriber lines are individually connected to the single common talking bus 12 by terminal and gate circuits 14. The trunks 13 in this instance may extend to distant offices and may be considered as substitutions for remote subscriber lines available for connection to lines 10 via the talking bus 12. The trunks merely serve to increase the traffic capacity of the system by providing access to various groups of subscribers in remote exchange areas.

In accordance with the Burton-Robinson-Younker patent application cited hereinbefore, each of the gates in terminal and gate circuits 14 is enabled in a regular sequence by a gate control circuit 15 including a sequence circuit which may advantageously be a binary counter circuit of the type disclosed in application Serial No. 263,598, filed December 27, 1951, by E. T. Burton, now Patent 2,828,071, issued March 25, 1958. The binary counter circuit recycles continuously after a specific number of steps, depending on the number of lines or trunks 13 which may be connected to the talking bus 12. Each individual step defines the time slot of a particular line or trunk and the total number of steps together define the office cycle of the time separation exchange.

The gates in terminal and gate circuits 11 are operated under control of information from a regenerative memory system included in the gate control circuit 16. Each such gate is identified by a code, and a particular line 10 is active while its code is in the memory system. During this time the associated gate is enabled once per office cycle in the time slot assigned to the trunk to which the line is connected through the exchange. As used herein the term "time slot" is defined as the time during which one line or trunk 13 is enabled, as described above, and thus during which one conversation may be sampled over the common talking bus 12. The term may be used to denote either the length of the interval of time or the relative position of such an interval in an office code. Thus, connection between two subscriber lines directly or over a trunk is effected by properly timed operation of the associated gates in circuits 11 and 14.

A master synchronizing circuit 17, which generates a synchronizing signal to mark the start of each time slot, serves to pace all timed circuit functions. A call service selector circuit 18 receives pulse information from the common talking bus 12, from the circulating memory 19, from the trunk gate control circuit 15, and from the master synchronizing circuit 17. This selector circuit 18 recognizes and processes requests for service. Memory circuit 19 circulates the identifying line codes, scans all the time slots and erases from the circulating memory the code appearing in any time slot in which there is not detected a pulse indicating that the particular time slot is being used.

Figure 3:
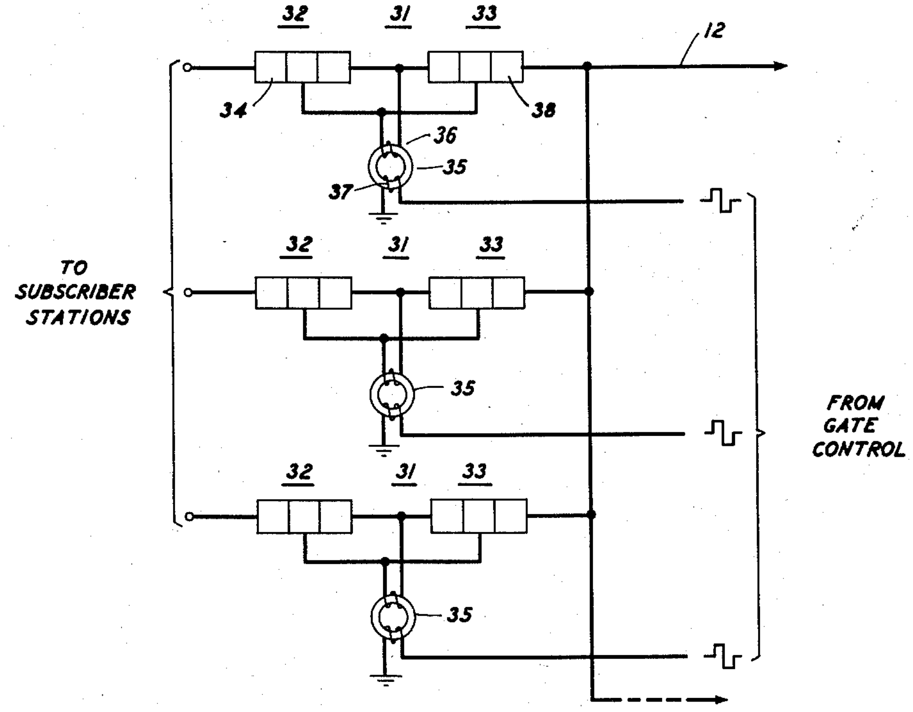
Fig. 3 is a schematic representation of a gating circuit illustrative of circuits which may be employed in the signal transfer circuit of Fig. 2.

Each of the lines 10 and lines or trunks 13 is connected to a single talking bus 12 by the gates in circuits 11 and 14, respectively, which advantageously may be combinations of transistors and magnetic cores as shown in Fig. 3 and described in the aforementioned J. D. Johannesen et al. patent.

As shown in Fig. 3, each of the gate circuits 31 comprises a pair of transistors 32 and 33 connected back-to-back in series in the signal path. The signal terminals of the gate circuit 31 are the two collector regions, one of which, collector 34, is connected to an individual subscriber line, or trunk, as appropriate, and the other of which, collector 38, is connected to the common talking bus 12. Accordingly, no matter what the polarity of the voltage impressed on the gate circuit 31, one of the transistors 32 and 33 has its collector reverse biased, thereby presenting a high series impedance in the signal path.

Control of the gate circuit 31 is effected by driving a current from the common base connection to the common emitter connection. This is accomplished by means of a square loop magnetic core 35 having an output winding 36 electrically connected between the common base lead and the common emitter lead and a drive winding 37 connected to the line gate control 16 or trunk gate control 15. A current pulse switches core 35 and opens the gate 31 during the core switching period. Upon cessation of switching or termination of the input pulse, the gate 31 again closes, thus defining a time slot.

Figure 2:
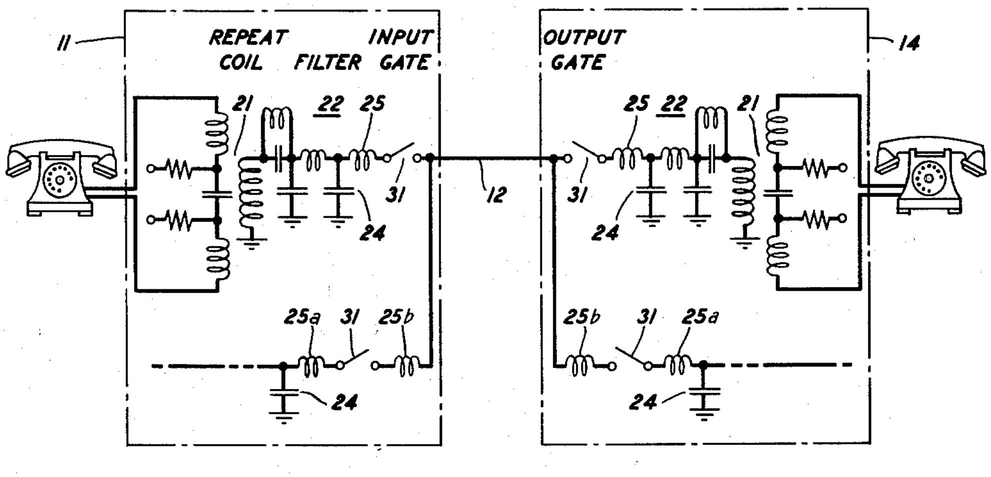
Fig. 2 is a schematic representation of one illustrative embodiment of a signal transfer circuit in accordance with this invention that may be employed in the telephone system of Fig. 1.

In Fig. 2 is shown one complete possible talking path between two subscriber lines and a portion of another possible talking path between other subscriber lines. The subscriber lines are connected to the single common talking bus 12 by the gates 31. The subscriber line terminal circuits comprise repeat coils 21 to take the line from balanced to unbalanced operation and to isolate the talking battery from the gate circuits and common equipment as is known in the art. A filter 22 is inserted in the transmission line between repeat coil 21 and gating circuit 31 so as to attenuate signals outside the voice frequency range. It comprises well known low pass filter elements, primarily sections of series inductance and shunt capacitance to produce the required cutoff characteristics. Such a filter, terminated in a shunt capacitance 24, presents a critical line loss problem when connected to a gating circuit as required in time division systems. The capacitance 24 in the transmitting line is charged across a high impedance during the interval between time slots for this line. This charged capacitance 24 is thereafter discharged during the short time slot interval assigned to these lines. The charge is transferred across a low impedance to a corresponding capacitance 24 in the receiving line and is transmitted through the high impedance circuit of the receiving line during the interval preceding the next time slot for these lines. The ensuing loss in transferring the charge through the gating circuit during the assigned time slot is intolerable in such systems.

In accordance with this invention, an inductance 25 is connected between one side of the capacitance 24 and the gate 31. The grounded side of the capacitance 24 provides a complete circuit, designated as the resonant transfer circuit, including capacitance 24, inductance 25 and gates 31 through which the charged capacitance 24 may discharge when the gates 31 are in their conducting state. The inductance 25 prevents the build-up of any significant current while the gate is changing condition, and thus prevents any loss due to spark dissipation. Normally, if spark dissipation can be avoided, a loss of an equivalent amount will be encountered which can be traced to high frequency oscillations between the two capacitances 24.

The individual time slot can be of any desired length determined by the characteristics of gates 31 and the length of input pulses thereto. The value of capacitance 24 is set by particular line and filter requirements. Therefore, in accordance with this invention, the inductance 25 is adjusted so as to provide a resonant frequency of the capacitance 24, inductance 25, gate 31 resonant transfer circuit in which the time for a half cycle at the resonant frequency equals the time slot interval. Thus, the charge on an capacitance 24 is completely transferred through the gates 31 to the second capacitance 24 during one time slot, and at the instant of current reversal in the oscillatory circuit, the gates 31 are disabled and return flow is prevented. A complete transfer of charge without loss is accomplished thereby. In this fashion relatively low speech attenuation is achieved in the system, a critical factor in time division telephone transmission systems.

It may be appreciated that in a system requiring transmission in one direction only, an inductance 25 adjacent one of the gates 31, is sufficient. Fig. 2 illustrates a two way transmission system, and in this instance an inductance 25 is required adjacent each gate 31. It is possible to achieve the desired performance by placement of the inductance on either side of each gate 31 as shown, in one form, in the complete circuit of Fig. 2. Also, a successful circuit may be designed with an inductance on both sides of each gate 31; e.g., inductance 25*a* and 25*b* in the incomplete circuit of Fig. 2.

It is to be understood that the above-described arrangements are illustrative of the application of the principles of the invention. Numerous other arrangements may be devised by those skilled in the art without departing from the spirit and scope of this invention.

What is claimed is:

1. A signal transfer circuit comprising, in combination, first capacitance means, gating means, inductance means connected to said gating means, second capacitance means connected between said gating means and said first capacitance means, means storing signals in said first capacitance means, and means enabling said gating means only for a period sufficient to transfer the charge on said first capacitance means to said second capacitance means.

2. A signal transfer circuit comprising, in combination, gating means, first capacitance means, inductance means connected between said first capacitance means and one side of said gating means, second capacitance means connected between the opposite side of said gating means and said first capacitance means, means applying input signals to charge said first capacitance means, and means alternately enabling and disabling said gating means at each half cycle of the resonant frequency of said circuit to transfer the charge from said first capacitance means to said second capacitance means.

3. A switching network for transfer of information from one subscriber line in a telephone system to another line or trunk comprising first capacitance means storing said information from said one subscriber line, gating means, second capacitance means, means activating said gating means to transfer said information from said first capacitance means to said second capacitance means, and inductance means, said capacitance, inductance and gating means forming a signal transfer circuit, said activating means being operative during a half cycle at the resonant frequency of said signal transfer circuit.

4. A time-sharing communication system comprising a plurality of calling lines and a plurality of called lines, capacitance means terminating each of said lines, a common transmission line, gating means periodically connecting one of said calling lines and one of said called lines coincidentally to said common line, inductance means connecting said one of said calling lines to said gating means, said inductance, terminating capacitance and gating means forming a resonant circuit, means charging said terminating capacitance of said calling line in accordance with a transmitted signal, and means enabling said gating means for a period equivalent to one-half cycle at the resonant frequency of said circuit to transfer the charge on said calling line capacitance to said called line capacitance.

5. A communication system comprising a plurality of signaling lines each comprising a filter network, first capacitance means connected to ground terminating said filter network in each of said signaling lines, a common transmission line, gating means connecting each of said signaling lines to said common transmission line, inductance means connected to said first capacitance means and said gating means, second capacitance means connected between said common transmission line and ground, said capacitance, inductance and gating means forming a resonant signal transfer circuit, means applying signals through said filter networks to said first capacitance means in each of said signaling lines, and means enabling said gating means sequentially for a period determined by the resonant frequency of said signal transfer circuits to transfer said signals sequentially from said first capacitance means to said second capacitance means over said common transmission line.

6. A telephone system comprising a plurality of subscriber lines, filter means in each of said lines to attenuate frequencies above the voice frequency ranges, capacitance means terminating said filter means, a common talking bus, gating means connecting certain of said lines to one end of said talking bus and other gating means connecting other of said lines to the opposite end of said talking bus, inductance means in each of said lines, said capacitance and inductance means connected between said gating means and ground, means coincidentally enabling said gating means in a pair of said lines connected to opposite ends of said talking bus to complete a resonant transfer circuit including said capacitance and inductance means in said pair of lines, and means applying a signal to said capacitance means in one of said pair of lines, said signal being transmitted over said talking bus to said capacitance means in the other of said pair of lines during enablement of said gating means.

7. A telephone system in accordance with claim 6 wherein said enabling means comprises means rendering said gating means conducting for a period equivalent to one half cycle at the resonant frequency of said transfer circuit.

8. A signal transfer circuit comprising first and second capacitance means, gating means and inductance means, means storing information in said first capacitance means, and means activating said gating means to transfer said information from said first capacitance means through said gating means to said second capacitance means, said activating means being operative in accordance with the resonant frequency of said signal transfer circuit.

9. A signal transfer circuit in accordance with claim 8 wherein said activating means comprises means to time the activation of said gating means for a duration equivalent to one half cycle at the resonant frequency of said signal transfer circuit.

10. A signal transfer circuit in accordance with claim 8 wherein said inductance means is connected between one of said first and second capacitance means and said gating means.

11. A signal transfer circuit in accordance with claim 8 wherein portions of said inductance means are connected on opposite sides of said gating means.

12. A signal transfer circuit in accordance with claim 8 wherein said gating means comprises first and second gating means, said inductance means being connected between said first and second gating means.

13. A signal transfer circuit in accordance with claim 12 wherein portions of said inductance means are connected on opposite sides of each of said first and second gating means.

References Cited in the file of this patent

UNITED STATES PATENTS

| | | |
|---|---|---|
| 1,721,492 | Wurst | July 16, 1929 |
| 2,045,224 | Gerhard | June 23, 1936 |
| 2,413,440 | Farrington | Dec. 31, 1946 |
| 2,414,265 | Lawson | Jan. 14, 1947 |
| 2,543,737 | Houghton | Feb. 27, 1951 |
| 2,870,259 | Norris | Jan. 20, 1959 |

Dedication 2,936,337.—*Willard D. Lewis*, Mendham, N.J. SWITCHING CIRCUIT. Patent dated May 10, 1960. Dedication filed Mar. 30, 1961, by the assignee, *Bell Telephone Laboratories, Incorporated*.

Hereby dedicates said Letters Patent to the public.

[*Official Gazette May 2, 1961.*]